United States Patent
Palmer et al.

(10) Patent No.: US 7,622,060 B2
(45) Date of Patent: Nov. 24, 2009

(54) FORMABLE, POROUS, CHEMILUMINESCENT REACTANT COMPOSITION AND DEVICE THEREFOR

(75) Inventors: William R. Palmer, Rescue, CA (US); Stephen L. Palmer, Cameron Park, CA (US); Earl Cranor, Longmeadow, MA (US)

(73) Assignee: Cyalume Technologies, Inc., West Springfield, MA (US)

( * ) Notice: Subject to any disclaimer, the term of this patent is extended or adjusted under 35 U.S.C. 154(b) by 41 days.

(21) Appl. No.: 10/076,051

(22) Filed: Feb. 12, 2002

(65) Prior Publication Data

US 2003/0155560 A1     Aug. 21, 2003

(51) Int. Cl.
*C09K 3/00*      (2006.01)
*F21K 2/06*      (2006.01)
*C08K 11/00*    (2006.01)

(52) U.S. Cl. ......................................... 252/700; 362/34
(58) Field of Classification Search ................. 252/700; 362/34, 84, 159; 222/94; 273/DIG. 24
See application file for complete search history.

(56) References Cited

U.S. PATENT DOCUMENTS

| | | | |
|---|---|---|---|
| 3,774,022 A | 11/1973 | Dubrow et al. | |
| 3,808,414 A | 4/1974 | Roberts | 362/34 |
| 3,816,325 A | 6/1974 | Rauhut et al. | 252/700 |
| 3,994,820 A | 11/1976 | Maulding et al. | 252/700 |
| 4,626,383 A | 12/1986 | Richter et al. | 252/700 |
| 4,814,949 A * | 3/1989 | Elliott | 362/34 |
| 5,043,851 A * | 8/1991 | Kaplan | 362/34 |
| 5,121,302 A * | 6/1992 | Bay et al. | 362/34 |
| 5,158,349 A | 10/1992 | Holland et al. | 362/34 |
| 5,173,218 A | 12/1992 | Cohen et al. | 252/700 |
| 5,344,670 A * | 9/1994 | Palmer et al. | 427/157 |
| 5,348,690 A | 9/1994 | Cohen et al. | |
| 5,705,103 A | 1/1998 | Chopdekar et al. | 252/700 |
| 6,062,380 A * | 5/2000 | Dorney | 206/217 |
| 6,065,847 A * | 5/2000 | Palmer et al. | 362/34 |
| 6,106,129 A * | 8/2000 | Cranor et al. | 362/34 |
| 6,126,871 A * | 10/2000 | Cranor | 252/700 |
| 6,461,543 B2 * | 10/2002 | Cranor | 252/700 |
| 2001/0010367 A1 | 8/2001 | Burnell-Jones | |

FOREIGN PATENT DOCUMENTS

EP     0 980 906 A2 *   2/2000
WO    WO01/60943       8/2001

* cited by examiner

*Primary Examiner*—Daniel S Metzmaier
(74) *Attorney, Agent, or Firm*—McHale & Slavin, P.A.

(57) ABSTRACT

A formable, porous chemiluminescent reactant composition, device therefore, and a process for production thereof is disclosed. The fluidizable solid admixture of the instant invention may be cured to a more or less rigid form with or without the use of a mold. The cured solid is useful as a chemiluminescent reactant component and is useful in a variety of environments.

46 Claims, 5 Drawing Sheets

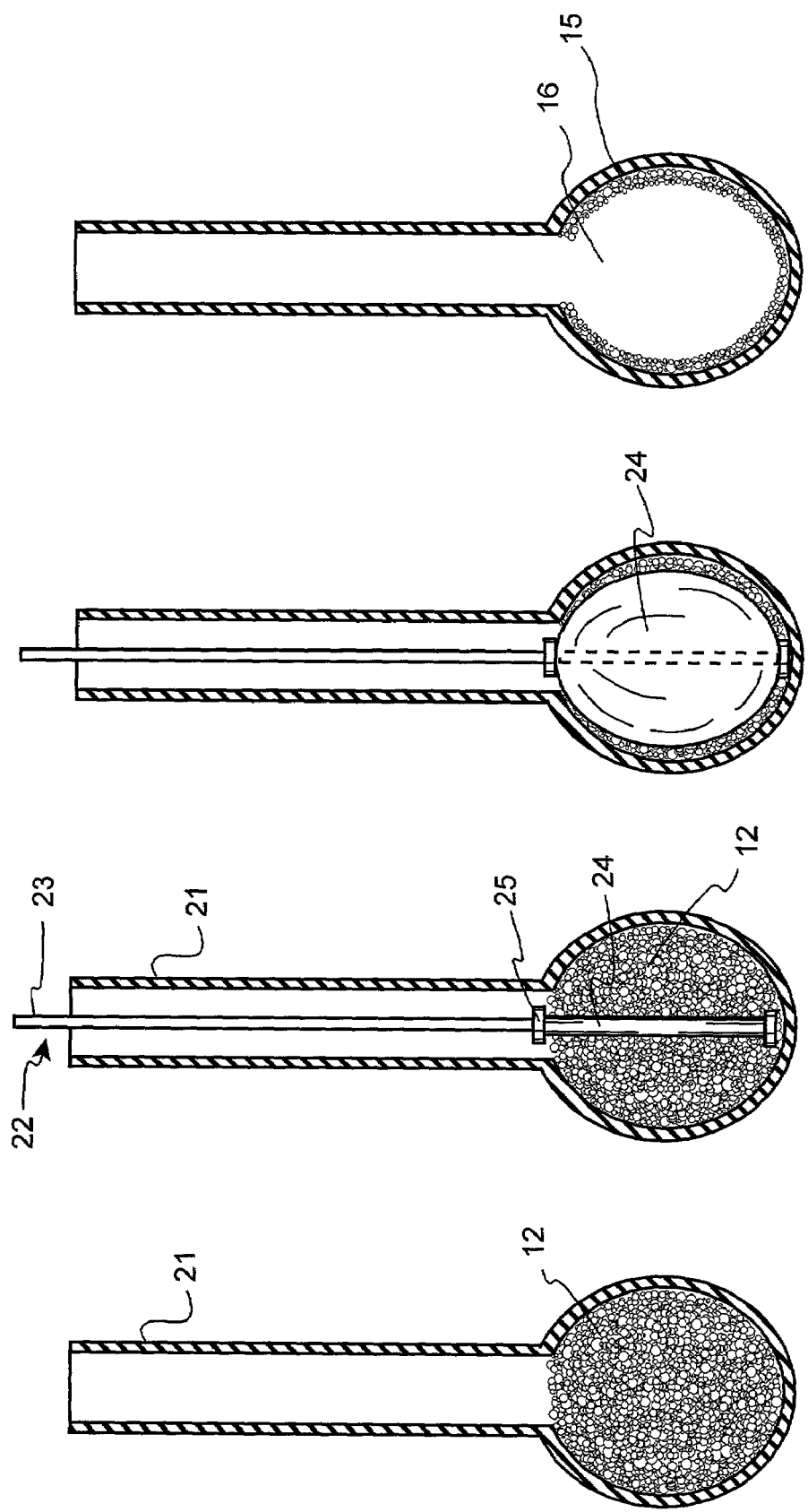

FORMABLE, POROUS, CHEMILUMINESCENT REACTANT COMPOSITION AND DEVICE THEREFOR

FIELD OF THE INVENTION

This invention is directed toward the field of chemiluminescent compositions and more particularly, to devices which produce light from an immobilized chemiluminescent material.

BACKGROUND OF THE INVENTION

The term "chemiluminescent reactant", "chemiluminescently reactive" or "chemiluminescent reactant composition" is interpreted to mean a mixture or component thereof which will result in chemiluminescent light production when reacted with other necessary reactants in the processes as disclosed herein.

The term "fluorescent compound" is interpreted to mean a compound which fluoresces in a chemiluminescent reaction, or a compound which fluoresces in a chemiluminescent reaction.

The term "chemiluminescent composition" is interpreted to mean a mixture which will result in chemiluminescence.

The term "deagglomerate" is interpreted to mean to break up or loosen a compacted portion of a cluster or a mass.

The term "fluidizable solid admixture" is interpreted to mean a non-liquid admixture which behaves as a pseudo fluid when agitated, but has properties of a solid when at rest.

Chemiluminescent light production generally utilizes a two-component system to chemically generate light. Chemiluminescent light is produced by combining the two components, which are usually in the form of chemical solutions referred to as the "oxalate" component and the "activator" component. All suitable oxalate and activator compositions, inclusive of the various additional fluorescers, catalysts and the like, known to be useful in the prior art, are contemplated for use within the present invention.

The two components are kept physically separated prior to activation by a variety of means. Often, a sealed, frangible, glass vial containing one component is housed within an outer flexible container containing the other component. This outer container is sealed to contain both the second component and the filled, frangible vial. Forces created by intimate contact with the internal vial, e.g. by flexing, cause the vial to rupture, thereby releasing the first component, allowing the first and second components to mix and produce light. Since the objective of this type of device is to produce usable light output, the outer vessel is usually composed of a clear or translucent material, such as polyethylene or polypropylene, which permits the light produced by the chemiluminescent system to be transmitted through the vessel walls. These devices may be designed so as to transmit a variety of colors by either the addition of a dye or fluorescent compound to one or both of the chemiluminescent reactant compositions or to the vessel. Furthermore, the device may be modified so as to only transmit light from particularly chosen portions thereof.

Examples of such a chemiluminescent system include: U.S. Pat. No. 5,043,851 issued to Kaplan. Kaplan discloses a polygonal, chemiluminescent lighting device which concentrates light in the corners of the device, thus enhancing visibility of light emanating from the light stick portion of the device and optimizing the amount and distribution of light radiated.

U.S. Pat. No. 4,626,383 to Richter et al. discloses chemiluminescent catalysts in a method for producing light in short duration, high intensity systems, and low temperature systems. This invention relates to catalysts for two component chemiluminescent systems wherein one component is a hydrogen peroxide component and the other component is an oxalate ester-fluorescer component. Lithium carboxylic acid salt catalysts, such as lithium salicylate, which lower the activation energy of the reaction and also reduce the temperature dependence of the light emission process are taught.

U.S. Pat. No. 5,121,302 to Bay et al. describes a solid, thin, chemiluminescent device emitting light in one direction. The device is comprised of a back sheet of a laminated metal foil having heat sealed thereto at its edges a bi-component front sheet and a temporary separation means positioned to divide the interior area into two compartments. The bi-component includes a first component of which is a laminated metal foil and a second component of which is a transparent or translucent polyolefin sheet. The metal foil of the bi-component offers heat stability, increased shelf life, and relative impermeability to volatile components of the activator solution. The metal foil laminate for activator solution storage enables the activator solution to retain its viability due to the impermeability of the metal foil.

U.S. Pat. No. 6,062,380 to Dorney discloses a glow cup system with illumination capabilities. The apparatus is a generally cylindrically-shaped container made out of a semi-rigid material, with a preferred embodiment comprised of a translucent plastic material, to allow limited flexibility at the outer layer of the cup as its form can be somewhat altered temporarily by applying pressure to the sides. Within the side wall of the cup is a cavity. The cavity contains a plurality of rupturable ampoules containing a chemiluminescent fluid. The chemiluminescent fluid within the ampoule is an oxalate. A second chemiluminescent fluid resides within the cavity so that when the ampoule breaks open, the two fluids make contact and provide illumination. The ampoule is broken by applying pressure by the user on the outer layer of the cup at the cavity point. The bottom of the cup contains a plug, which may or may not be removable, which seals the second chemiluminescent component within the cavity spacing.

Additionally, it is desirable to produce chemiluminescent light from objects of various shapes or forms. U.S. Pat. No. 4,814,949 issued to Elliott discloses a means of making shaped, two-dimensional, chemiluminescent objects. Conventional liquid, chemiluminescent reagents are combined to produce light. A non-woven, absorbent article in the desired shape is permitted to absorb the chemiluminescent reagents after mixing and activation so that the article emits light from the shape desired. Although the shape may be as simple or as complex as desired, it is essentially limited to a two-dimensional surface and is additionally limited to producing a single color of light per device.

An example of creating a chemiluminescent system capable of producing light from a swellable polymeric composition is disclosed in U.S. Pat. No. 3,816,325 issued to Rauhut et al. Two primary means are employed to produce solid chemiluminescent systems. The first system relies on diffusion of a chemiluminescent oxalate solution into a solid polymer substrate such as a length of flexible vinyl tubing. The diffusion process occurs when a length of the vinyl tubing is immersed in a suitable chemiluminescent reagent for an extended period of time. After removal of the tubing from the oxalate solution, application of liquid activator to the surface of the tubing causes the tubing to emit light. Since the solid polymer is relatively non-porous, it is difficult to rapidly and completely activate the oxalate in the tubing because the relatively slow process of diffusion must also be relied upon to permit the activator solution to reach the chemiluminescent reagent diffused into the polymer before light can be generated.

In a further embodiment of U.S. Pat. No. 3,816,325, the chemiluminescent oxalate solution is mixed with a polyvinyl chloride (PVC) resin powder to form a paste, which is then spread on a substrate and baked in an oven to form a flexible, elastic film. While this embodiment is operative, the polyvinyl chloride sheet described exhibits weaknesses in uniformity, strength, flexibility, and most importantly, porosity. Additionally, the processes described are primarily suitable for producing relatively thin objects only.

U.S. Pat. No. 5,173,218 to Cohen et al. discloses a combination of PVC polymer resins to produce a porous, flexible, chemiluminescent structure from liquid slurries. Although an improvement in the art, the products produced still suffer from a variety of shortcomings, particularly if solid, chemiluminescent objects are to be produced which are other than relatively flat, thin objects. A thin "pad" is produced from a mixture of polymer resins, which is strong and flexible, and exhibits satisfactory absorptive properties of the activator fluid. However, the processes taught focus on producing pads which are made by pouring a liquid slurry mixture into molds. As such, the slurry and hence, the resulting pad shape, is limited to the shape of the mold, into which the slurry is poured and pools. Additionally, it is well-known to those skilled in the art that the formulas and processes utilized in the prior art may produce chemiluminescent pads with a relatively tough and impermeable "skin" wherever the slurry has been in contact with the mold during the baking process. This skin is easily recognized as a darker and more transparent region of the pad and is highly impermeable. Consequently, it is incapable of rapidly absorbing liquid activator solution and as such, minimally contributes to light output of the device. The thickness of this skin varies with the time and temperature of the baking process, but in any event, this skin represents wasted material from which little usable light may be produced. It has been determined that this skin is created by an inability of the slurry to draw in air (or other gasses) during the baking process. To achieve a significantly porous product, air must enter the slurry mixture during the baking process from the exposed surfaces of the slurry pool. During the curing process, air is usually drawn into the pad to replace the volume occupied by solvents which become absorbed into the PVC resins. This process continues as air is drawn down to ever increasing depths within the pad as first the upper regions of the pad cure and then successively lower regions of the pad cure. It is this inclusion of air into the pad during the baking process which primarily determines the percent of open pore space and hence absorptiveness of the pad. At some point during the baking process described, the bottom of the mold may reach a temperature at which the slurry mixture in contact with this region of the mold begins to jell and cure, even though an air path from the exposed surfaces of the slurry to this lower region may not have been created. Due to a lack of air available to this jelling slurry, this "bottom up" curing process results in a pad which is tough, dense, and virtually non-porous in the region of the pad proximal to the mold bottom and to a lesser extent, the mold edges. Certain adverse effects of this bottom up curing process can be minimized if the bottom of the mold is placed on a cold thermal mass in the curing oven, thereby providing for heating and curing of the bottom portion of the slurry following the remainder of the slurry. Nonetheless, the undesirable production of a tough and impermeable skin layer remains unaddressed.

During the baking processes, such as those disclosed in U.S. Pat. No. 5,173,218, the slurry expands as air is drawn into the polymer matrix, which air adds to the volume of the matrix. As a result, significant problems develop when attempting to cure a relatively large mass of this slurry. For example, if a liquid slurry mixture, as taught in the '218 patent, is poured into a test tube and baked for the appropriate time to cure, a dense, tough mass will be produced exhibiting very poor porosity and hence, poor absorbency throughout most of the mass. This is due in part to the "bottom up" curing process described above wherein insufficient air is drawn into the slurry during the curing process due to the existence of an air tight liquid layer above the slurry being cured near the mold bottom. Additionally, it has been unexpectedly found that the slurry materials will not draw in the requisite air if the slurry is inhibited from expanding during the curing process. In the case of the test tube example above, the side walls of the test tube constrain the slurry from expanding and drawing in the air required to produce a cured matrix with the high degree of porosity and absorbency required to permit activation of the product with liquid activator. Even though the slurry is free to expand vertically in the test tube during the curing process, the lateral constraint on the slurry by the walls of the test tube is sufficient to prevent optimal expansion of the slurry and air induction into the mass during the curing process. As such, the cured mass will exhibit low porosity and yield poor light output which is a limitation of the art.

It is often desirable to provide a chemiluminescent device which is not only capable of producing light, but producing light in a variety of colors. U.S. Pat. No. 5,508,893 issued to Nowak et al. is directed toward a multi-color chemiluminescent lighting device and method of producing the product. This device is comprised of a flexible tube filled at least partially with an activator solution, a plurality of ampoules containing oxalate solutions located within the tube, and at least one barrier element between ampoules to prevent color mixing. This device is capable of imparting different chemiluminescent colors following activation.

U.S. Pat. No. 5,705,103 issued to Chopdekar et al. describes a composition for producing chemiluminescent light of controllable duration. The composition is comprised of an oxalate component (including an oxalate ester) in a solvent, an activator component (a peroxide compound and a catalyst) in a solvent, and a fluorescer. By appropriate selection of the molecular weight of the homopolymer for the oxalate component, control of the total glow time and the point in time at which commencement of light production occurs may be varied. Although this device provides a controllable duration or stability of light, there is no suggestion of a composition to control the generation of gas produced or a composition which may be independent of a container, i.e. not formable or porous.

Thus, what is lacking in the art is a means for producing three-dimensional objects which are self-illuminated by means of chemiluminescence, and producing a highly porous composition to exhibit quick activation and excellent light output. In addition, the prior art fails to contemplate a product which may be independent of a container, minimizes dark areas due to gas generation, and which is capable of generating a plurality of spatially separated or wavelengths of chemiluminescent light simultaneously.

SUMMARY OF THE INVENTION

The instant invention teaches a means to produce three-dimensional objects which are self-illuminated. The objects may be as simple or as complex as desired. The objects are produced by a method employing a formable, chemiluminescent reactant composition. This composition is of such a nature that it may be readily placed in variously shaped containers and then cured in said containers whereupon the composition becomes solid and is of a shape that precisely matches the container in which it was formed. Once formed, the composition is semi-rigid and may be removed from the container if desired. Additionally, the instant invention provides for a chemiluminescent reactant composition which is exceptionally porous and is not limited to relatively flat strips of material, as is the case in prior art. Also, objects produced by means of the instant invention may be hollow so that a minimal amount of material may be used to produce glowing, three-dimensional objects. Further, these objects may be multi-colored, that is, a single object can be created which is capable of simultaneously generating a plurality of spatially separated colors or wavelengths of chemiluminescent light.

A fundamental objective of the instant invention is that a significant portion of the interstitial spaces in the solid product necessary for quick and reliable activation by a liquid activator is created prior to curing. As such, the system does not rely primarily on porosity created during the curing process in which the air must enter the matrix from outside. Since the final porosity of the product of the instant invention is primarily a function of the degree of densification prior to curing, the final porosity of the product may be precisely and advantageously controlled.

Typically, it is desirable to provide a product which will activate as quickly as possible. For this to occur, the activator solution must react quickly and completely with the oxalate portion of the chemiluminescent system. There are times, however, when it may be desirable to slow down the rate of reaction or perhaps at least, slow down the rate at which the activator is able to reach the oxalate component and react with it. Since the product of the instant invention may be densified to practically any desirable degree, the interstitial space available through which the activator communicates with the solid product may be reduced as desired, thereby reducing the mobility of the activator and its ability to react with the solid oxalate containing component. Additionally, because most of the porosity of the chemiluminescent solid is determined by the degree of densification prior to curing, the product of the instant invention can be cured in a relatively confined space, such as a test tube, and the resulting product will be highly porous and receptive to activator solution.

Accordingly, it is an objective of the instant invention to provide for a means to produce three-dimensional objects which are capable of self-illumination through chemiluminescence and which objects may generate a plurality of spatially separated colors or wavelengths simultaneously.

It is a further objective of the instant invention to produce a three-dimensional chemiluminescent object which is highly porous.

It is a further objective of the instant invention to provide for a three-dimensional chemiluminescent object in which the porosity can be readily and precisely controlled.

It is a still further objective of the invention to provide for a three-dimensional chemiluminescent object which may be produced by forming in a mold which may not permit significant expansion of the chemiluminescent reactant composition during the curing process.

It is yet another objective of the instant invention to provide for three-dimensional chemiluminescent objects which have little or no dark regions due to "skin" effect caused by improper curing.

It is a further objective of the instant invention to provide for a three-dimensional chemiluminescent object which may be formed in such a manner that the object is hollow.

It is a still further objective of the invention to provide for a three-dimensional chemiluminescent object in which a substantial portion of the porosity is created prior to the curing process.

It is yet another objective of the instant invention to provide for a formulation for a chemiluminescent reactant composition which is formable and as such, may be readily formed into a desired shape either with or without the use of a mold or form.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

BRIEF DESCRIPTION OF THE FIGURES

FIG. 6 is a cross sectional view of another example embodiment of the instant invention illustrating placement of the chemiluminescent reactant composition;

FIG. 7 is a cross sectional view of the embodiment of FIG. 6 illustrating positioning of a compression tool within the chemiluminescent reactant composition;

FIG. 8 is a cross sectional view of an embodiment of the instant invention illustrating densification of the chemiluminescent reactant composition by the compression tool of FIG. 7; and, FIG. 9 is a cross sectional view of an embodiment of the instant invention illustrating the densified chemiluminescent reactant composition.

DETAILED DESCRIPTION OF THE INVENTION

The present invention is directed toward a formulation, process of making, and device for use regarding a chemiluminescent reactant composition which is formable, and may be used to produce a multi-dimensional object. This composition overcomes weaknesses of the prior art and implements the use of a novel forming process to be applied to a chemiluminescent material, thereby furnishing a highly porous, uniquely shaped, chemiluminescent object. The process of the instant invention is not limited to the conventional casting process producing relatively thin, flat objects described in the prior art.

The formable and porous powder of the instant invention may be readily compacted to various degrees, and upon heat curing, may form a relatively strong, flexible, and highly porous mass. The apparent density of a material is easily controlled through the degree of compaction, or densification. Therefore, an object of any desirable apparent density may be produced. Because apparent density directly affects the speed of activator absorption, the rate of chemiluminescent activation may be advantageously controlled.

Figure 1:
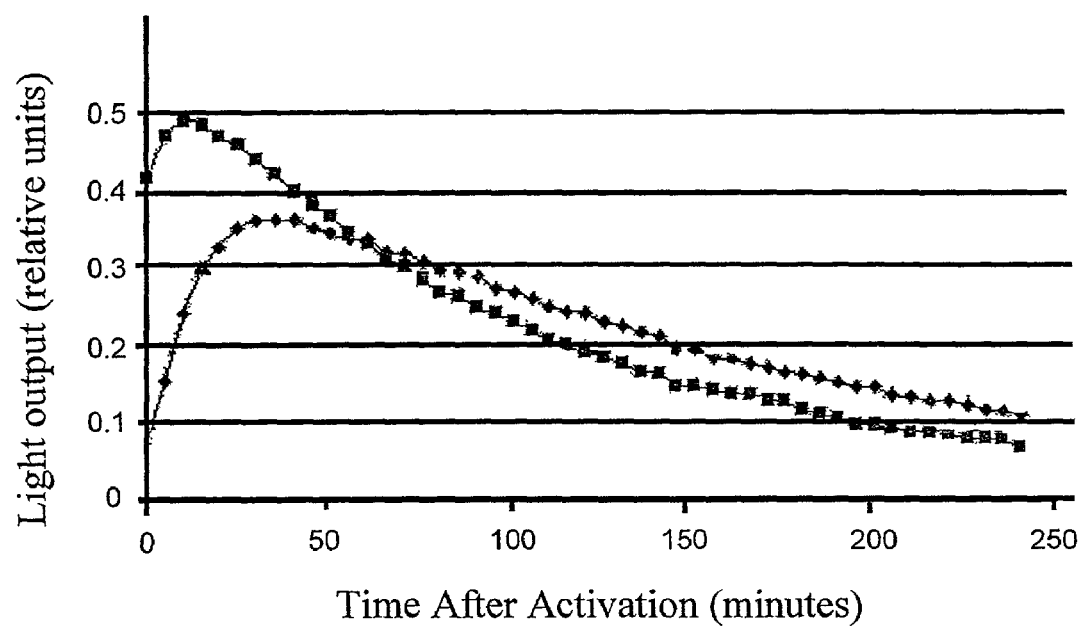
FIG. 1 is a chart depicting light output versus activation time for differing bulk densities of solid oxalate.

Now with reference to the figures, FIG. 1 is a chart depicting how the control of bulk product density may be used to vary activation time. Two devices were produced and tested, each comprising a chemiluminescent reactant composition which is in the form of a solid oxalate containing composition, hereinafter referred to as a solid oxalate. The first device had a bulk density of approximately of 0.54 g/cc and reached maximum light output at approximately 10 minutes after activation. The second device, with a bulk density of about 0.72 g/cc, reached its peak light output at approximately 37 minutes after activation. This data indicated that activation time is affected by bulk density with more compacted objects requiring a longer period to activate. The ability to control the light output curve enables the production of chemiluminescent devices to meet a wide array of market needs.

By way of example, for the production of large chemiluminescent objects, a hollow chemiluminescent shape may be preferred to a solid one, since there is a diminishing return effect as light produced from deep within the solid shape reaches the surface inefficiently and may not be emitted as useful light. Additionally, a hollow chemiluminescent shape provides for a convenient and elegant means to introduce a second reactant component to the product. An ampoule or vessel containing a second reactant component may be placed inside the void in a hollow shape. When the ampoule or vessel is ruptured, the second component is readily absorbed by the interior surface of the hollow shape and is quickly transferred by capillary action through the porous, chemiluminescent matrix until the entire mass is wetted and producing light through chemiluminescence. Placing the second component means inside the void also hides it from view and permits production of a more aesthetically pleasing product. An example of a form which may be produced using the teaching of the instant invention is that of a chemiluminescent candle. Such candles provide a safe, reliable alternative to real candles. The flame from real candles can ignite other objects. Unlike conventional candles, chemiluminescent candles are wind resistant and waterproof and by employing the instant invention, can be produced to emit light in any color desired or in any combination of colors or wavelengths from a single device.

Previous attempts at producing these "candles" which use chemiluminescent systems as light sources have met with drawbacks. Typically, a chemiluminescent lighting device, such as a light stick, which employs liquids, has a head-space in the device which represents approximately 30% of the container volume. Light cannot be produced in this head-space area. Japanese Pat. Application No. 10-170263 discloses an air bubble capture means in which the gaseous head-space (or bubble) which is above the liquid chemiluminescent fluid in a sealed chemiluminescent device is trapped in a region of the device other than the uppermost portion. By displacing the bubble from the upper tip portion of a sealed chemiluminescent device, such as a candle for example, the entire portion of the candle flame tip will appear to glow during the chemiluminescent reaction. If the bubble had been permitted to remain at the flame tip, it would create a dark region near the top of the flame since the area of the bubble will not produce any light. Such a dark region would detract from the overall visual acceptability of the device. Carbon dioxide, carbon monoxide, and oxygen are common gases liberated in peroxyluminescent systems. These gases rise to the top of any liquid chemiluminescent system and form bubbles at the top of the device. Thus, while the device described in Japanese Pat. Application No. 10-170263 may effectively eliminate the problem of bubbles initially contained at the top of a chemiluminescent device, a method is not provided to displace bubbles which are generated during the chemiluminescent process. The instant invention permits a candle or any other chemiluminescent object desired to be produced in which an initial head-space bubble in the device and any significant visible build up of bubbles in the device as the chemiluminescent process progresses is eliminated. In addition, the instant invention does not require any specially formed traps, channels, or valves in the device to realize this benefit. Since the formable mass of the chemiluminescent system of the instant invention is a solid, there is no space for bubbles to aggregate and combine. While gasses generated during the chemiluminescent process are still produced, these gasses are constrained from rising in the solid formable mass and are evenly distributed throughout the solid, which subsequently result in a seemingly flawless output of light.

Figure 2:
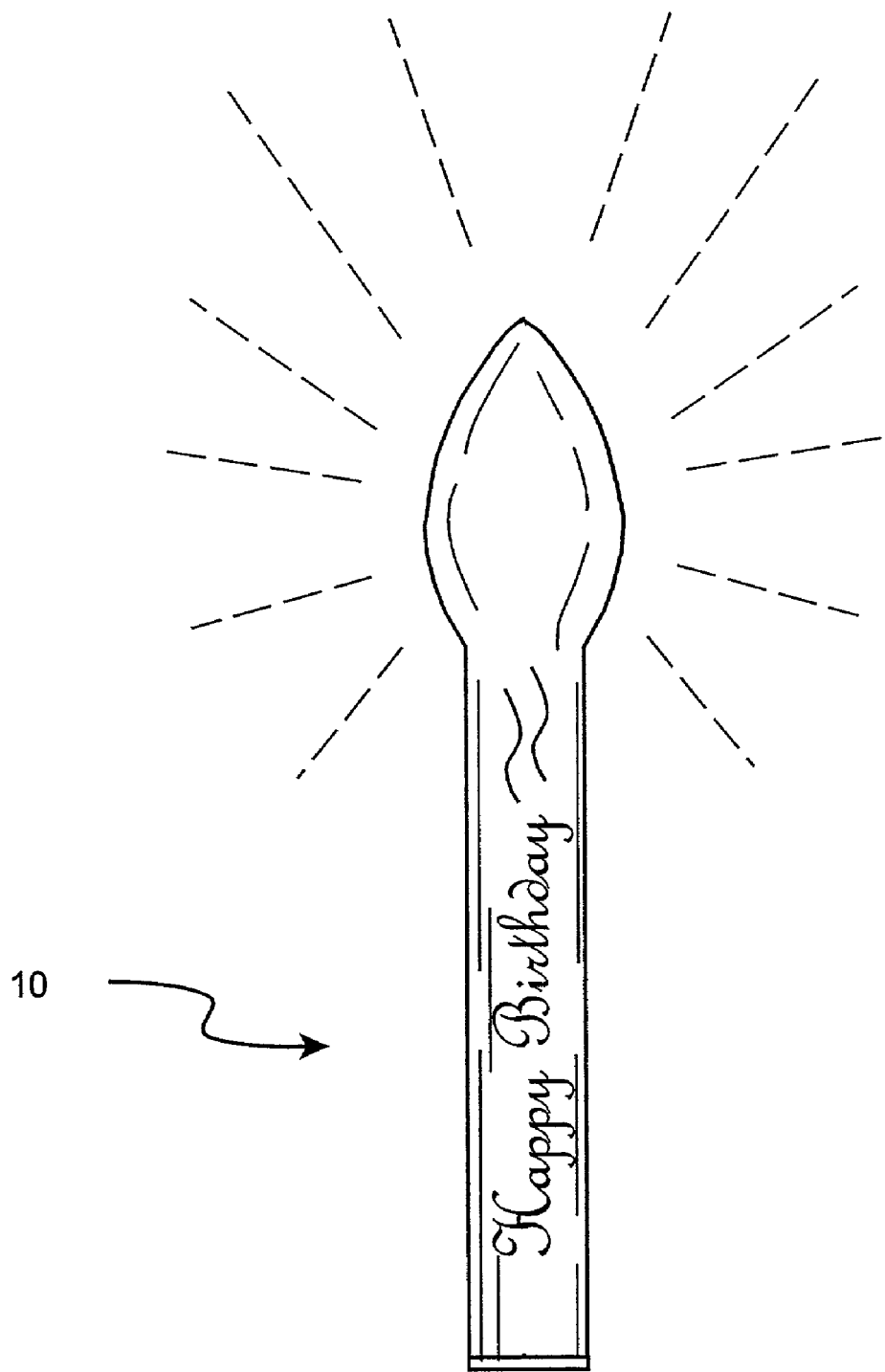
FIG. 2 is a pictorial view of an example embodiment of the instant invention.

FIG. 2 sets forth a preferred embodiment of the present invention as a chemiluminescent candle 10 which comprises a blow-molded envelope in the shape of a candlestick. When the device is activated, the flame portion of the candle glows.

Figure 4:
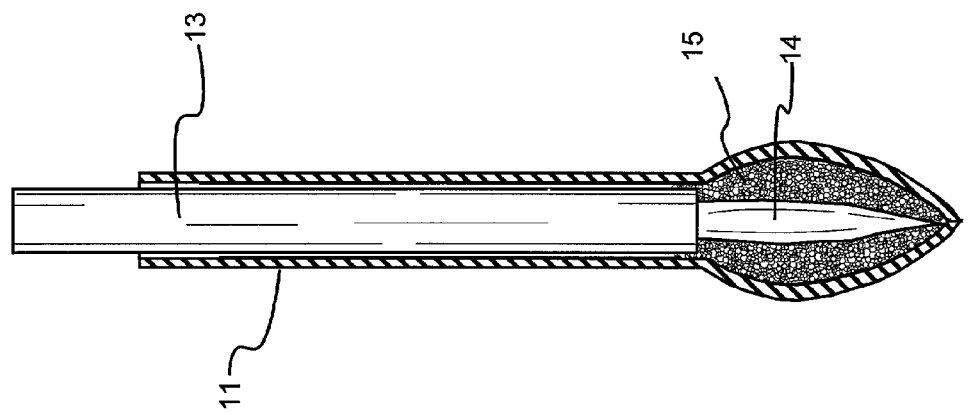
FIG. 4 is a cross sectional view of FIG. 3 illustrating densification of the chemiluminescent reactant composition using a tamping tool.
Figure 3:
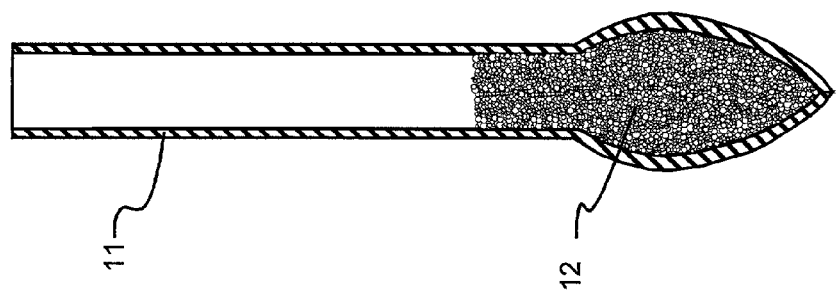
FIG. 3 is a cross sectional view of the example embodiment of FIG. 2 illustrating placement of the chemiluminescent reactant composition.
Figure 5:
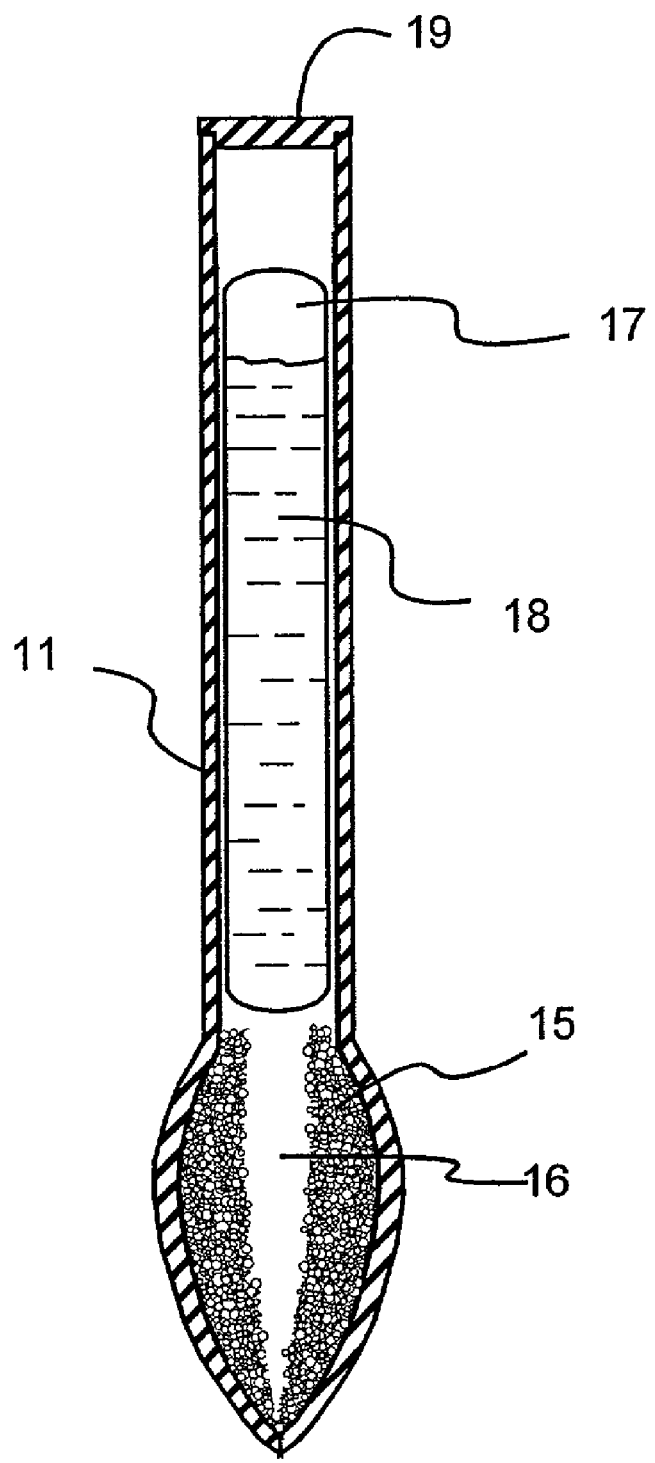
FIG. 5 is a cross sectional view of the example embodiment following densification, illustrating second chemiluminescent reactant component ampoule placement and a void in the fluidizable solid admixture.

A candle envelope 11, as illustrated in FIG. 3, may be created by blow-molding or other suitable forming means from materials such as, but not limited to, polyethylene or polypropylene. Preferably, the distal end of the candle envelope opposite the flame shape is left open. The candle envelope 11 is positioned so that the open end is up. A formable chemiluminescent reactant composition 12 of the instant invention, is placed into a candle envelope 11 so that the envelope is partially full. While the fluidizable solid admixture is flowable, it also exhibits a degree of cohesiveness, and yields a packable, formable, moist powder. Therefore, an auxiliary feeding means, such as a vibratory feeder, may be useful to aid in feeding the formable chemiluminescent reactant composition 12. Once the formable chemiluminescent reactant composition 12 is in the candle envelope 11, it may be compacted slightly with a tamping tool 13, as illustrated in FIG. 4, designed for this purpose. This compression process not only serves to assist the composition in conforming to the shape of candle envelope 11, but also densifies the composition and compresses it so that it will not flow or be further displaced in the candle envelope 11 should the envelope orientation be altered. The composition may however, be removed from the envelope, if desired, by application of sufficient vibratory forces so as to cause liquefaction of the compacted chemiluminescent reactant composition 15. A tamping tool 13 may be designed with a tapered tip 14 such that it will not only compact the composition but also produce a cavity 16, as illustrated in FIG. 5, in the resultant compacted composition. The cavity 16 provides a convenient means to facilitate distribution of a second chemiluminescent reactant component 18, such as within an ampoule 17 and promotes quick, even activation of the device. Once the second chemiluminescent reactant component is in place, a plug 19 at the distal end of the candle envelope 11 may be heat sealed. Additionally, the cavity 16 provides a space into which the composition may expand during the curing process so that an exceptionally porous product may be produced. The cavity is not required to produce products which are highly porous but may be employed in certain cases to produce products with exceptional porosity. Such cavities are not possible with the processes taught in the prior art.

As set forth in FIG. 6, a chemiluminescent rose-shaped envelope 21 is produced by first blow-molding an envelope, from polyethylene by way of example, into the shape of a rose bud with a stem attached. The diameter of the stem is considerably smaller than that of the bud. For this preferred embodiment, it is desirable to produce a rose bud where the entire surface of the bud is illuminated through chemiluminescence. It is also desirable to produce the item using the least chemiluminescent material possible which will create the desired effect. The rose-shaped envelope 21 is filled with a small quantity of formable chemiluminescent reactant composition 12.

Referring now to FIG. 7, inserted into the rose-shaped envelope 21 with a chemiluminescent reactant composition 12 is a compression tool 22 comprising a hollow needle 23 equipped with an expandable bladder 24, which for purposes of illustration is depicted as being held in place by at least one retainer ring 25. The distal end of the hollow needle 23 is plugged and a hole in the side of the needle beneath the expandable bladder 24 permits air pressure from within the needle to fill and inflate the expandable bladder 24. The bladder expands, as illustrated in FIG. 8, by using air pressure for inflation purposes, whereby the formable chemiluminescent reactant composition 12 surrounding the inflated bladder 24 compacts against the interior wall of the rose bud envelope. FIG. 9 illustrates the compacted chemiluminescent reactant composition 15 in a semi-solid state. Following this compression process, the bladder deflates and the needle probe is removed, leaving a cavity 16. The compacted chemiluminescent reactant composition may subsequently be cured by baking while in place inside the rose bud envelope, in a preferred embodiment, at 95° C. for 10 minutes. After the composition cools, a sealed ampoule containing a solution of second chemiluminescent reactant component is inserted into the rose-shaped envelope 21 and a plug may be fitted to the stem and heat sealed to form a hermetic seal as previously described for the candle embodiment. The resulting product is an object appearing as a realistic rose bud which, when activated, emits light from the entire surface of the bud. Activation is accomplished, by way of example, by simply flexing the stem of the rose to fracture the ampoule and release the second component which is then absorbed into the chemiluminescent reactant composition, or formable solid admixture. Since the compacted chemiluminescent reactant composition highly conforms with the interior wall of the envelope, even fine details such as petals of the rose are captured by the process of the instant invention.

Concerning the candle and rose embodiments as discussed, it is assumed that the cured solid product will remain in the polymer envelope, however, the material may just as easily be cast and cured in a mold and then removed. Solid chemiluminescent objects may be produced employing the instant invention using, by way of example, compression or centrifugal molding. Individually shaped items produced by the process of the instant invention could be included as free-floating objects which would glow if placed in a vessel containing a second chemiluminescent reactant component solution. Such a system could produce, by way of example, a "snow globe" which contains glowing snow particles. Since the formable mass of the chemiluminescent reactant composition in the instant invention is in solid form, a plurality of positionable and spatially fixed colors may be employed in a single device. For example, a rose bud may be produced in which the bud is red with orange stripes.

A significant advantage of the instant invention over a fully liquid chemiluminescent system, such as that found in conventional light sticks, is that the entire surface of the object may be caused to glow if desired.

Since the resultant product of the instant invention is a solid chemiluminescent material, the product may be utilized in situations where it is impractical or impossible to use a liquid chemiluminescent system which is dependent upon its container.

The following examples describe the experimental process performed to reach the novelties of the present invention.

A series of experiments were devised to identify optimal materials and formulas necessary to produce a formable, porous, chemiluminescent reactant composition. As taught in the prior art, a pre-slurry may be prepared by dissolving approximately 2 parts PVC resin (Geon Corp. #121) with 98 parts of a chemiluminescent reactant solution which is exemplified herein as an oxalate solution. A slurry was prepared, also according to '218, by mixing 59 parts oxalate pre-slurry (from above) with 31 parts medium particle size PVC powder resin (Geon #218) and 9 parts large particle size PVC resin (Geon #30). The resultant material is a pourable, liquid slurry.

EXAMPLES 1-6

Six tests were conducted to determine the effects of varying cure times and temperatures as well as slurry thickness on porosity. In each test, approximately 7 grams of liquid slurry was placed in a small aluminum weighing pan which was then positioned on a spacer such that the pan bottom was slightly inclined to create a slurry having a depth ranging from 0.015" to 0.180". During each test, the pan was placed on a wire rack in a circulating air oven. After curing for the specified time, each sample item was removed from the pan, sectioned, and examined for proper curing and porosity. A properly cured sample is defined as one in which all of the oxalate solution had been absorbed into the PVC matrix, and which does not exhibit signs of over-curing. In a properly cured matrix, the lower molecular weight PVC particles fuse together. However, the higher molecular weight PVC particles, while absorbing the liquid oxalate solution, do not significantly fuse together. If the curing time and temperature is excessive, the higher molecular weight PVC particles will fuse together, resulting in a matrix which is over-cured as evidenced by the presence of dark and/or shiny regions within the cured sample, referred to as a pad. This over-cured matrix will exhibit very low porosity.

Table I illustrates the results obtained using various slurry curing conditions:

TABLE I

| | Slurry Curing | | |
|---|---|---|---|
| Test Item | Cure Time (minutes) | Cure Temp (° C.) | Result/Observation |
| 1 | 3 | 95 | Under-cured/doughy in thick areas |
| 2 | 5 | 95 | Possibly over-cured; non-porous in area which contacted pan |
| 3 | 8 | 95 | Non-porous in pan contact areas to about ⅓ thickness of pad |
| 4 | 10 | 95 | Dense; non-porous in bottom ⅓ thickness of pad |
| 5 | 20 | 95 | Dense; non-porous in bottom ⅓ thickness of pad |
| 6 | 8 | 82 | Less dense areas; dark and dense in areas which contacted pan |

In test item 1, it was apparent that the PVC particles had not completely absorbed the oxalate solution as the material was doughy and contained significant amounts of free liquid. In tests 2-5, the material was found to be less doughy, but only the exposed surface of each cured sample was determined to be porous.

Each of the test items 1-5 were activated with chemiluminescent activator reagent. Items 2-5 glowed from the surface, but did not produce significant light from the dark, non-porous areas. Item 1 produced very little light over most of its surface, presumably because the liquid oxalate solution that was not absorbed into the PVC matrix during the curing process presented a barrier, preventing the activator solution from reaching the balance of the liquid oxalate below the surface. Some glow was evident near the surface of the matrix at the boundary layer where the activator and oxalate solutions combined. Item 6 was cured at a lower temperature since items 1-5 appeared to be over-cured by application of excessive heat, causing the high molecular weight PVC particles to fuse together. The test results from item 6, however, contradicted this theory. Even at the lower time and temperature used to cure item 6, there was still evidence of dark, dense regions where the pad had been in contact with the pan.

EXAMPLE 7

A chemiluminescent candle was produced using the same liquid slurry formation as that used in tests 1-6 above. To make this candle, approximately 3.2 grams of liquid slurry was injected into a polyethylene candle envelope using a syringe. A glass ampoule containing chemiluminescent activator was inserted into this slurry such that the lower end of the ampoule contacted the inside bottom of the candle envelope. The assembly was placed in a circulating air oven set for 82° C. and allowed to cure for 12 minutes. After removal, the assembly was allowed to cool to room temperature whereupon the candle envelope and cured slurry were sectioned for observation. The PVC matrix (cured slurry) appeared to be fully cured, but was dark and dense. The PVC matrix portions were removed from the envelope and placed in an aluminum weighing pan. Chemiluminescent activator reagent was added to these portions whereupon the cured slurry glowed dimly. It was observed that the activator was reacting only with the outermost surface of the cured slurry and could not reach the cured slurry interior. This lack of absorption of the activator solution into the cured slurry was determined not to be the result of over-curing or under-curing of the slurry, but was due to very low porosity exhibited by the pad. Porosity, or pore space, within the matrix derives from two sources. A small portion of this porosity results from the already porous PVC particles in the matrix. A more significant factor in determining the resultant porosity of the cured slurry is the ability of air to be inducted into the entire slurry volume during the curing process. It was observed when utilizing the liquid slurry formulation taught in '218, that if heat sufficient to cure the slurry reaches an interior region before outer regions are fully cured and porous, the interior region will cure with low porosity. This effect is due to the inability of air to migrate through this surrounding liquid region to the interior.

EXAMPLE 8

With these results in mind, an aliquot of slurry was supported upon an air permeable substrate, e.g. a 10 cm by 10 cm section of 2 mm thick non-woven polyester felt and placed in a circulating air oven, maintained at 82° C., for 8 minutes. The expectation was that the felt would provide uniform access of air to the slurry and that heat would cure the slurry from the outside in such a manner that no dark, non-porous regions would be formed as had been the case in slurry previously cured in the impermeable aluminum pans. As each successive layer of the slurry cured from the outside in, it would become porous, thereby allowing air to reach subsequent layers. This sample was removed from the oven and allowed to cool. Upon inspection, it was noted that the pad had no dark or dense areas and was extremely porous. The sample was activated with chemiluminescent activator reagent whereupon the sample glowed brightly and evenly throughout its entirety.

A model which explains the formation of interstitial spaces in PVC particle/solvent slurries is that in which large, roughly spherical, PVC particles are joined together by smaller, lower molecular weight, PVC particles to form a matrix. The PVC particles absorb the solvent that had initially filled the interstitial spaces between these particles. If air is permitted to enter the matrix during this curing process, the PVC particles will swell and expand as the solvent is absorbed into the particles.

EXAMPLE 9

To determine if increased air access through the slurry could be achieved by using a greater weight percent of larger particle PVC, a new preparation of slurry was created and tested. This new slurry contained 56 parts pre-slurry, 29 parts medium size particle resin (Geon #218) and 15 parts large particle size resin (Geon #30). Approximately 2.5 ml of this liquid slurry was placed in a polyethylene candle envelope to which a glass activator ampoule was added. The item was cured at 75° C. for 12 minutes and allowed to cool. It was apparent after dissection that the slurry had been cured, but still contained dark regions that were nonporous.

The theory that a formulation of PVC resin and liquid oxalate could be produced in a manner that would result in a material allowing air to move through the formulation at all times prior to and during curing was then developed and tested.

EXAMPLE 10

A new formulation was created which utilized the pre-slurry described above by dissolving approximately 2 parts PVC resin (Geon Corp. #121) with 98 parts of an oxalate solution. Although in this example the liquid oxalate solution was propylene glycol dibenzoate based, any base compound in the art is contemplated. In this new formulation, a higher weight percent of a single PVC particle was used in place of the medium and large particle PVC resins employed in the slurries previously described. Approximately 40 parts of pre-slurry were added to 60 parts of resin (Geon #466). The resulting composition was not a liquid slurry, but rather a moist, packable and formable powder characterized as a fluidizable solid admixture. The resin should be selected so as to contain a particle size or range thereof sufficient to provide said fluidizable solid admixture. In an illustrative, albeit not limiting embodiment, this resin is a PVC resin having an average particle size distribution of about 125 microns.

A large variety of polymers may be employed in the polymeric composition: polyethylene, polypropylene, poly(vinyl Chloride), Poly(methyl methacrylate), poly(vinyl benzoate), poly(vinyl acetate), cellulose poly(vinyl pyrrolidone), polyacrylamide, epoxies, silicones, poly(vinyl butyral), polyurethane, nylons, poly acetyl, polycarbonate, polyesters and polyethers are non-limiting examples. Cross-linked polymers may also be employed, such as polystyrene-poly(divinyl benzene), polyacrylamide-poly(methylenebisacrylamide), polybutadiene-copolymers, and the like. For most applications the polymer should be selected in conjunction with the activating hydrogen peroxide liquid so as to be dissolvable, swellable, or otherwise permeable to said activating liquid.

Such permeability is normally desired to permit efficient contact between the activating liquid, the chemiluminescent material, and (when desired or necessary) the fluorescer. It will often be desirable to select the polymer and activating liquid so as to provide a particular diffusion rate and thus control the intensity and duration of light emission. Some useful polymer-solvent combinations are: 1) poly(vinyl pyrrolidone)-water, 2) poly(vinyl styrene-polydivinyl benzene) copolymer-ethylbenzene, 3) poly (vinyl chloride-ethyl benzoate), 4) poly(methyl methacrylate dimethyl phthalate). The permeability of polymers to solvents is, of course, well known to the art and it is a straightforward matter to select useful polymer/solvent combinations. Solvents used as plasticizers are particularly advantageous. It is not necessary for either the chemilumininescent material or a fluorescer to be soluble in the polymer itself, although where the polymer does not itself provide solubility for both these ingredients, the activating liquid should provide at least partial solubility. Alternatively the polymer could be plasticized with a solubilizing plasticizer.

The moist powder of the resulting chemiluminescent reactant composition has a consistency similar to light brown sugar. Due to the cohesive nature of the fluidizable solid admixture, it has been found to be beneficial to deagglomerate or loosen any compressed portions by a method such as by being sifted through a screen mesh or stirred with a whisking tool to insure that the moist powder would not become compacted prior to use. To aid in material placement, a vibratory feed system may be used as well. Although the above serve as examples for loosening compacted portions, any means for deagglomerating the fluidizable solid admixture may be used. The newly created formulation along with the discovery that pre-existing interstitial spaces in the material are critical to the curing process resulted in an immediate and significant improvement in the time required for complete chemiluminescent activator reagent absorption and corresponding light output.

The formable, chemiluminescent reactant composition thus comprises a first chemiluminescently reactive component in combination with an amount of first polymeric resin particles effective to yield a uniform dispersion, visualized as a liquid slurry. An amount of second polymeric resin particles in combination with the uniform dispersion in an amount effective to yield a fluidizable solid admixture is then provided. This fluidizable solid admixture may be molded to form a specific shape. A means for deagglomerating the fluidizable solid admixture may be provided in order to loosen any portions of the mass which may have been compacted during preparation. A means to cure the fluidizable solid admixture may also be provided either with or without the use of a mold. In a preferred embodiment, the first polymeric resin particles and second polymeric resin particles are each a polyvinyl chloride resin. Although an activator solution is commonly added to a composition to commence the emission of light, the oxalate and activator of the instant invention may be interchangeable. In such a case the first chemiluminescently reactive component might comprise an oxalate, and the second chemiluminescently reactive component might then comprise an activator. Optionally, the first chemiluminescently reactive component might comprise the activator and the second chemiluminescently reactive component might then comprise an oxalate.

In order to provide a chemiluminescent system, the second component must be included. Therefore, a chemiluminescent composition of the present invention comprises a first chemiluminescent reactant including a first chemiluminescently reactive component in combination with an amount of first polymeric resin particles effective to yield a uniform dispersion and an amount of second polymeric resin particles in combination with the uniform dispersion in an amount effective to yield a fluidizable solid admixture. A second chemiluminescent reactant component is included, wherein contact between the first and second chemiluminescent reactant components will result in the generation of light. The generation of light includes at least one distinct wavelength, within the visible or invisible spectrum. A means may be provided to controllably activate the fluidizable solid admixture.

A multi-dimensional chemiluminescent device is also disclosed comprising at least one first chemiluminescent reactant including a first chemiluminescently reactive component in combination with an amount of first polymeric resin particles effective to yield a uniform dispersion and an amount of second polymeric resin particles in combination with the uniform dispersion in an amount effective to yield a fluidizable solid admixture. At least one fluidizable solid admixture is dispersed within a multi-dimensional container, whereby densification of the fluidizable solid admixture causes the formation of the multi-dimensional chemiluminescent device. Contacting the device with a second chemiluminescent reactant component will result in generation of chemiluminescent light. As previously noted, the resulting emission of light may be of more than one distinct wavelength or color. Means for compacting or densification of the fluidizable solid admixture thereby provide a means to controllably activate the fluidizable solid admixture and may be accomplished by a variety of techniques all contemplated by the instant invention. By way of example, the densification of the fluidizable solid admixture is by a molding technique, wherein a moldable object is formed or a hollow object is formed having areas of controlled densification. These variations in density are illustrative of a controlling parameter for the light emitting reaction, and result in an object which is termed as being controllably activated.

A process for the production of a chemiluminescent reactant composition of the instant invention comprises providing a first polymeric resin, then combining a first chemiluminescently reactive component, typically in solution form, with an effective amount of the first polymeric resin to create a slurry. A second polymeric resin is provided which is combined with the slurry in an amount effective to create a fluidizable solid admixture. A means for providing controllable activation of the fluidizable solid admixture is also included which may be accomplished by compacting the admixture to a desired degree. As illustrated in FIG. 1, the more compact the mass, the longer it takes to reach a peak light output.

This fluidizable solid admixture is significantly different than the liquid slurry taught in U.S. Pat. No. 5,173,218 in that it is not a liquid and will not seek its own level. The fluidizable solid admixture is also significantly different from the paste described in U.S. Pat. No. 3,816,325 in that it is flowable, but will neither sag nor slump. Most significantly, this powder composition has an intrinsically high degree of porosity and interconnecting, interstitial air spaces. Additionally, the fluidizable solid admixture has a cohesive nature which permits it to be formed into definite, solid shapes by simply pressing the moist powder together with a gentle force. By way of example, the material may be manipulated with a human hand, or placed between two plates to create a thin sheet. Furthermore, the cohesion exhibited by the moist powder is sufficient to retain a desired shape after pressing. By way of example, the fluidizable solid admixture may be pressed into small cakes either with or without the use of forms and simply cured by baking in an oven whereupon the individual particles in the powder bond together into a single porous mass.

In an alternative embodiment, the fluidizable solid admixture may be placed into a mold and baked (cured) to form a solid object which has a shape precisely matching that of the mold. Since the moist powder, once slightly compacted, is not flowable such as a dry powder or liquid slurry would be, the fluidizable solid admixture of the instant invention may be shaped, processed, or otherwise manipulated in such a manner that a hollow object is produced. Such hollow chemiluminescent objects have great value in that the outer, light-emitting surface of the object may be formed into any desired shape while maintaining a hollow interior. This hollow interior not only permits conservation of chemiluminescent material and thereby reduces cost, but also allows relatively large chemiluminescent objects to be produced which exhibit a high surface brightness at minimal cost.

Although PVC is the preferred polymeric resin, the polymeric composition is not limited thereto.

Various methods for shaping and/or processing are applicable to the chemiluminescent reactant composition of the present invention. Examples of such methods include, but are not limited to, injection molding, extrusion, compression molding, cast molding, powder molding, or electrostatic deposition, such as xerography. Powder molding comprises dry blending the moist powder and a curable additive to form a moldable composition.

Additionally, the fluidizable solid admixture may be deposited electrostatically through a process such as xerography, wherein the surface of a container retaining the chemiluminescent reactant composition is given an electric charge. Adhesion between the chemiluminescent reactant composition and the container surface occurs only at the charged areas to enable particular placement of a chemiluminescent reactant composition within a container.

All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A moist, packable and formable powder chemiluminescent reactant composition comprising:
    a chemiluminescent reactant component and a first particulate polymeric resin in amounts effective to yield a uniform dispersion upon admixture thereof; and
    a second particulate polymeric resin in an amount effective to yield a moist, packable and formable powder upon admixture with said uniform dispersion;
    wherein admixture of said second particulate polymeric resin and said uniform dispersion yields said moist, packable and formable powder chemiluminescent reactant composition defined by a substantially homogenous mixture of distinct particles having sufficient cohesive properties to permit said composition to be formed into a desired shape without a mold.

2. The composition of claim 1, wherein said moist, packable and formable powder chemiluminescent reactant composition is deagglomerated.

3. The composition of claim 1, wherein said moist, packable and formable powder chemiluminescent reactant composition is cured.

4. The composition of claim 1, wherein said moist, packable and formable powder chemiluminescent reactant composition is formed into a specific shape without employing a mold.

5. The composition of claim 1, wherein said first particulate polymeric resin is a polyvinyl chloride.

6. The composition of claim 1, wherein said second particulate polymeric resin is a polyvinyl chloride.

7. The composition of claim 6, wherein said second particulate polymeric resin is porous.

8. The composition of claim 6, wherein said second particulate polymeric resin has a mean particle size distribution sufficient to provide said moist, packable and formable powder chemiluminescent reactant composition.

9. The composition of claim 8, wherein said second particulate polymeric resin has an average particle size of about 125 microns.

10. The composition of claim 1, wherein said chemiluminescent reactant component comprises an oxalate.

11. The composition of claim 1, wherein said chemiluminescent reactant component comprises an activator.

12. A chemiluminescent composition comprising:
    a first chemiluminescent reactant component including a chemiluminescent reactant solution and a first particulate polymeric resin in amounts effective to yield a uniform dispersion upon admixture thereof and a second particulate polymeric resin in an amount effective to yield a-moist, packable and formable powder first chemiluminescent reactant component defined by a substantially homogenous mixture of distinct particles having sufficient cohesive properties to be formed into a desired shape without a mold; and
    a second chemiluminescent reactant component;
    wherein contact between said first and second chemiluminescent reactant components will result in generation of chemiluminescent light.

13. The composition of claim 12, wherein said moist, packable and formable powder chemiluminescent reactant composition is deagglomerated.

14. The composition of claim 12, wherein said moist, packable and formable powder chemiluminescent reactant composition is cured.

15. The composition of claim 12, wherein said moist, packable and formable powder chemiluminescent reactant composition is formed into a specific shape without employing a mold.

16. The composition of claim 12, wherein said first particulate polymeric resin is a polyvinyl chloride.

17. The composition of claim 12, wherein said second particulate polymeric resin is a polyvinyl chloride.

18. The composition of claim 17, wherein said second particulate polymeric resin is a porous polyvinyl chloride.

19. The composition of claim 17, wherein said second particulate polymeric resin has a mean particle size distribution sufficient to provide said moist, packable and formable powder chemiluminescent reactant composition.

20. The composition of claim 12, wherein said first chemiluminescent reactant component includes an oxalate and said second chemiluminescent reactant component includes an activator.

21. The composition of claim 12, wherein said first chemiluminescent reactant component includes an activator and said second chemiluminescent reactant component includes an oxalate.

22. The composition of claim 12, wherein said generation of light includes at least one distinct wavelength or color.

23. The composition of claim 12, wherein said moist, packable and formable powder chemiluminescent reactant composition is controllably activated.

24. A process for the production of a moist, packable and formable powder chemiluminescent reactant composition, comprising the following steps:
    admixing a chemiluminescent reactant component with a first particulate polymeric resin in an amount effective to yield a uniform dispersion; and
    admixing a second particulate polymeric resin with said uniform dispersion, in an amount effective to yield a moist, packable and formable powder upon admixture with said uniform dispersion;
    wherein said chemiluminescent reactant composition is defined by a substantially homogenous mixture of distinct particles having sufficient cohesive properties that allow said composition to be formed into a desired shape without a mold.

25. The process of claim 24, wherein said first particulate polymeric resin is a polyvinyl chloride.

26. The process of claim 24, wherein said second particulate polymeric resin is a polyvinyl chloride.

27. The process of claim 26, wherein said second particulate polyvinyl chloride is porous.

28. The process of claim 26, wherein said second particulate polyvinyl chloride has a mean particle size distribution sufficient to provide said moist, packable and formable powder chemiluminescent reactant composition.

29. The process of claim 24, wherein said moist, packable and formable powder chemiluminescent reactant composition is cured.

30. The process of claim 24, wherein said chemiluminescent reactant component includes an oxalate.

31. The process of claim 24, wherein said chemiluminescent reactant component includes an activator.

32. The process of claim 24, wherein said moist, packable and formable powder chemiluminescent reactant composition is deagglomerated.

33. The process of claim 24, wherein said moist, packable and formable powder chemiluminescent reactant composition is formed into a specific shape without employing a mold.

34. A multi-dimensional chemiluminescent device comprising:
    at least one first chemiluminescent reactant composition including a first chemiluminescent reactant component having a first particulate polymeric resin in an amount effective to yield a uniform dispersion and a second particulate polymeric resin admixed to said uniform dispersion in an amount effective to yield at least one moist, packable and formable powder chemiluminescent reactant composition defined by a substantially homogenous mixture of distinct particles having sufficient cohesive properties that allow said composition to be formed into a desired shape without a mold;
    wherein said at least one moist, packable and formable powder chemiluminescent reactant composition is dispersed within a multi-dimensional container, whereby densification of said moist, packable and formable powder chemiluminescent reactant composition causes formation of said multidimensional chemiluminescent device;
    whereby contacting said device with a second chemiluminescent reactant component will result in generation of chemiluminescent light.

35. The composition of claim 34, wherein said moist, packable and formable powder chemiluminescent reactant composition is deagglomerated.

36. The device of claim 34, wherein said moist, packable and formable powder chemiluminescent reactant composition is cured.

37. The device of claim 34, wherein said moist, packable and formable powder chemiluminescent reactant composition is formed into a specific shape without employing a mold.

38. The device of claim 34, wherein said first particulate polymeric resin is a polyvinyl chloride.

39. The device of claim 34, wherein said second particulate polymeric resin is a polyvinyl chloride.

40. The device of claim 39, wherein said second particulate polyvinyl chloride is porous.

41. The device of claim 39, wherein said second particulate polyvinyl chloride resin has a mean particle size distribution sufficient to provide said moist, packable and formable powder chemiluminescent reactant composition.

42. The device of claim 34, wherein said first chemiluminescent reactant component includes an oxalate and said second chemiluminescent reactant component includes an activator.

43. The device of claim 34, wherein said first chemiluminescent reactant component includes an activator and said second chemiluminescent reactant component includes an oxalate.

44. The device of claim 34, wherein said generation of light includes at least one distinct wavelength or color.

45. The device of claim 34, wherein said densification provides a means to controllably activate said moist, packable and formable powder chemiluminescent reactant composition.

46. The device of claim 37, wherein said densification of said moist, packable and formable powder chemiluminescent reactant composition is by a molding technique, wherein a hollow object is formed.

* * * * *